(12) United States Patent
Kincaid et al.

(10) Patent No.: US 10,904,837 B2
(45) Date of Patent: *Jan. 26, 2021

(54) SYSTEMS AND METHODS FOR CONTROLLING ELECTRONICALLY OPERABLE ACCESS DEVICES USING WI-FI AND RADIO FREQUENCY TECHNOLOGY

(71) Applicant: Schlage Lock Company LLC, Carmel, IN (US)

(72) Inventors: Ryan C. Kincaid, Indianapolis, IN (US); Lakshmi Santhanakrishnan, Carmel, IN (US); Brian A. Telljohann, Indianapolis, IN (US); Kevin P. Oehler, Fishers, IN (US); Nabeel Bitar, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,863

(22) Filed: Mar. 26, 2019

(65) Prior Publication Data
US 2019/0289553 A1   Sep. 19, 2019

Related U.S. Application Data

(63) Continuation of application No. 14/817,933, filed on Aug. 4, 2015, now Pat. No. 10,244,478, which is a (Continued)

(51) Int. Cl.
*H04L 12/28*   (2006.01)
*H04W 52/02*   (2009.01)
(Continued)

(52) U.S. Cl.
CPC .... *H04W 52/0251* (2013.01); *G07C 9/00174* (2013.01); *G07C 9/00571* (2013.01);
(Continued)

(58) Field of Classification Search
CPC ........................................................ H04L 12/28
(Continued)

(56) References Cited

U.S. PATENT DOCUMENTS

RE43,990 E    2/2013  Golden
8,467,361 B2  6/2013  Luetschwager et al.
(Continued)

OTHER PUBLICATIONS

Canadian Office Action; Canadian Intellectual Property Office; Canadian Patent Application No. 2,873,247; dated Nov. 16, 2016; 3 pages.
(Continued)

*Primary Examiner* — Dang T Ton
(74) *Attorney, Agent, or Firm* — Taft Stettinius & Hollister LLP

(57) ABSTRACT

Systems and methods are disclosed for controlling access devices including WI-FI and dual radio communications between an access control database and one or more access devices in a facility. The systems and methods allow real time communications between the database and the access devices utilizing existing communications WI-FI infrastructure in the facility while minimizing loss of battery life of the access devices by employing the radio network to target all or a portion of the access devices for communications when needed.

20 Claims, 7 Drawing Sheets

Related U.S. Application Data continuation of application No. 13/888,648, filed on May 7, 2013, now Pat. No. 9,098,953.

(60) Provisional application No. 61/644,384, filed on May 8, 2012.

(51) Int. Cl.
  *G07C 9/00* (2020.01)
  *G07C 9/28* (2020.01)
  *H04W 84/12* (2009.01)

(52) U.S. Cl.
  CPC ........... *G07C 9/00817* (2013.01); *G07C 9/28* (2020.01); *H04W 52/0219* (2013.01); *G07C 9/00563* (2013.01); *G07C 2009/00825* (2013.01); *H04W 84/12* (2013.01); *Y02D 30/70* (2020.08)

(58) Field of Classification Search
  USPC ......................................................... 370/329
  See application file for complete search history.

(56) References Cited

U.S. PATENT DOCUMENTS

| | | |
|---|---|---|
| 9,098,953 B2 | 8/2015 | Kincaid et al. |
| 2006/0123229 A1 | 6/2006 | Holloway et al. |
| 2008/0089277 A1 | 4/2008 | Alexander et al. |
| 2010/0283579 A1* | 11/2010 | Kraus ................ G07C 9/00944 340/5.7 |
| 2011/0012709 A1 | 1/2011 | Payson et al. |

OTHER PUBLICATIONS

Canadian Office Action; Canadian Intellectual Property Office; Canadian Patent Application No. 2,873,247; dated Jul. 4, 2017; 3 pages.

Mexican Office Action; Mexican Patent Office; Mexican Patent Application No. MX/a/2014/013661; dated Jul. 11, 2017; 4 pages.

International Search Report and Written Opinion; International Application No. PCT/US2013/39886; ISA/US; dated Jul. 19, 2013; 8 pages.

* cited by examiner

SYSTEMS AND METHODS FOR CONTROLLING ELECTRONICALLY OPERABLE ACCESS DEVICES USING WI-FI AND RADIO FREQUENCY TECHNOLOGY

CROSS-REFERENCE TO RELATED APPLICATION

This application is a continuation of U.S. application Ser. No. 14/817,933 filed on Aug. 4, 2015 and issued as U.S. Pat. No. 10,244,478, which is a continuation of U.S. application Ser. No. 13/888,648 filed on May 7, 2013 and issued as U.S. Pat. No. 9,098,953, which claims the benefit of the filing date of U.S. Provisional Application No. 61/644,384 filed on May 8, 2012, the contents of each application incorporated by reference herein in their entireties.

FIELD OF THE INVENTION

The invention relates to systems and methods for control and operation of electronic access devices in commercial, residential, industrial, storage, medical, and other facilities that can be monitored and controlled remotely through a computer system that selectively wakes the access devices via a radio signal from a radio frequency bridge device connected to the computer system, and the access devices are further selectively connected to the computer system with a wireless fidelity (WI-FI) connection for data transmission when waked with the radio signal.

BACKGROUND

Existing electronic lock systems are used to control access to various areas within a facility. Some systems employ wireless locks that communicate with an interface device that is in sufficient proximity to the electronic locks to enable radio communication. The various interface devices are hardwired to a central database that is connected to the computer system of the facility. The computer system provides updates to the electronic locks through this radio communication network. However, the hardwired connection of the interfaces devices with the access control device can be expensive in large facilities, and creates concerns that the hardwiring is redundant with the existing wiring of the various area networks of the facility.

Some electronic lock systems leverage the existing WI-FI and other networks of the facility to communicate with the electronic locks so that programming and/or data can be transmitted to each lock without requiring separate updates for each lock. However, WI-FI systems are employed off-line, meaning that communication between the computer system and the electronic locks is only established at pre-determined intervals to preserve battery life of the electronic locks, which are desired to operate for several years between battery changes. Therefore, further improvements in this area of technology are desired.

SUMMARY

In one aspect, there is disclosed systems and methods for controlling one or more access devices using WI-FI and radio frequency networks connected to an access control device. The systems and methods provide real-time communications between the access devices and the access control device, which includes software and a database for updating of credentials, software, and other aspects of each access device while preserving battery life of the access device. The systems and methods can also be operated in an off-line mode where communication between the access control device and the access device is established at predetermined intervals. These and other aspects, features, forms, embodiments, objects, and advantages are also discussed below with reference at least in part to the accompanying drawings.

DETAILED DESCRIPTION

Figure 1:
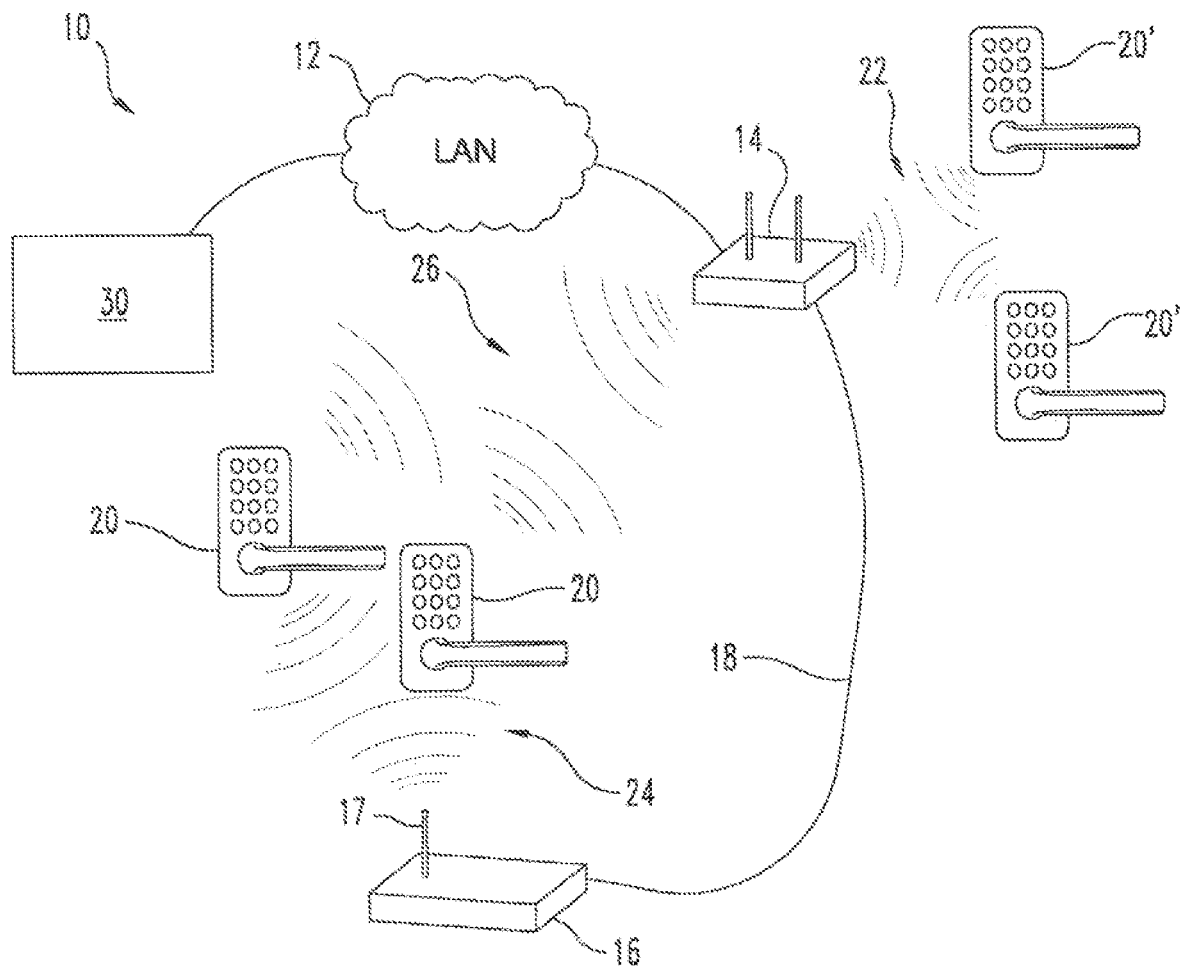
FIG. 1 is a diagram of a system for connecting a computer network to a plurality of access devices with a radio frequency (RF) bridge device and/or a WI-FI connection to allow on-line and off-line remote monitoring and control of the access devices from an access control device.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Systems, devices and methods are disclosed for remote monitoring and control of access devices that are connectable to a WI-FI network and to a radio frequency network. The access devices can be located in or on, for example, a commercial building, industrial facility, medical facility, residential building or facility, hotel or resort facility, a residence, a storage facility, or other structure or group of structures. In one form, the access devices are configured to work with one or more bridge devices that provide RF communication with the access devices, with the bridge device(s) and access devices integrated into the computer network of the facility to leverage the facility's WI-FI network and allow real time communications between an access control database and selected access devices in order to minimize power consumption of the access devices for which communication is not needed.

FIG. 1 illustrates an access control system 10 that monitors and controls electronic access devices 20 including but not limited to electronic door locks. Access devices 20 may also include or alternatively be any one or more of deadbolts, cameras, lights, temperature controls, appliances, and the like. The system 10 includes a computer network 12 that can be coupled to an access control device 30, which includes a database and software for operating the access control system. Computer network 12 can be any one or combination of wired local area network, a wireless area network, or the internet. Computer network 12 can further include a routing device 14. At least one RF bridge device 16 couples an RF network 24 to the computer network 12. In one embodiment, bridge device 16 is connected to computer network 12 with an Ethernet cable or other suitable connection with routing device 14.

FIG. 1 illustrates a plurality of access devices 20 in the form of door locks, e.g. for use on an entrance door of a building, room or other part of a structure, that is configured to receive RF signals as part of the RF network 24 and that are also configured to send and receive signals to computer network 12 via a WI-FI connection 26. However, it should be understood that many other devices can send and receive RF signals as part of the RF network 24 and WI-FI connection 26 and the illustrated door lock is simply an example of one of these devices.

In the RF network 24, each connected device 20 acts as a communication node that can receive a radio signal as a wakeup signal from access control device 30 through its assigned bridge device 16, and then communicate to send and receive information packets via WI-FI connection 26 with computer network 12 to other devices in the system 10, such as access control device 30. If a wakeup signal is not addressed to the access device 20 in RF network 24, the access device 20 ignores the wakeup signal. If the particular wakeup signal is addressed to the access device 20 that interrogates it, the access device 20 is awakened from a sleep mode and operates in a wake or run mode to communicate with access control device 30 through the WI-FI connection 26 with computer network 12. In this arrangement, the battery operating life of each access device 20 is maintained since only access devices 20 that are designated to receive information from access control device 30 are awakened in real time for information downloads and information uploads. The interrogation of the wakeup signal by access device 20 occurs in conjunction with radio frequency communications, increasing battery life since the bridge device 16 transmits RF signals and the RF receiver of the access device 20 can operate at a lower power level when compared to standard wireless networks.

Figure 2:
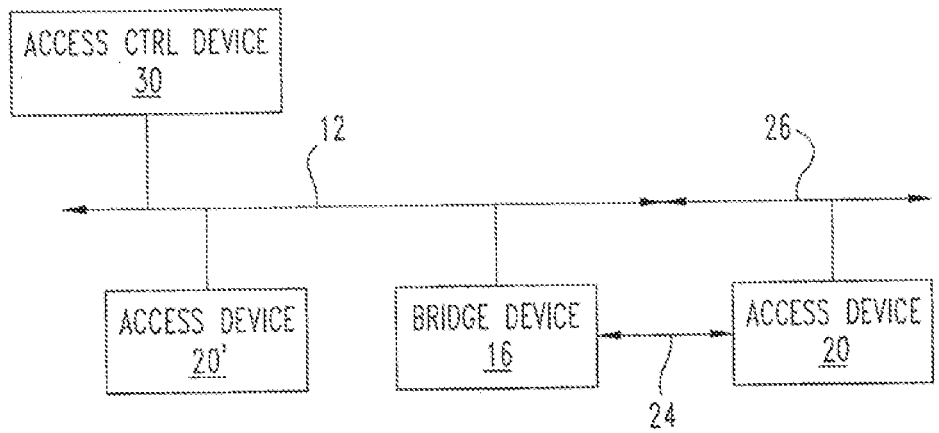
FIG. 2 is a block diagram of the system of FIG. 1.

Referring further to FIG. 2, in one construction, the RF network 24 communicates via a sub-1 GHz beacon with each of the access devices 20 in the radio network through an assigned bridge device 16. In systems 10 with multiple bridge devices 16 having access devices 20 assigned to respective ones thereof, access control device 30 can identify which bridge devices 16 connected to computer network 12 to alert in order to send a wakeup signal to only a portion of access devices 20 in the system 10. The wakeup signal enables WI-FI communication of the awakened access device 20 with access control device 30 through WI-FI connection 26, which handles large data volumes more efficiently. Access device 20 downloads information packets from and transmits information packets to access control device 30 via WI-FI connection 26 with computer network 12.

Figure 3:
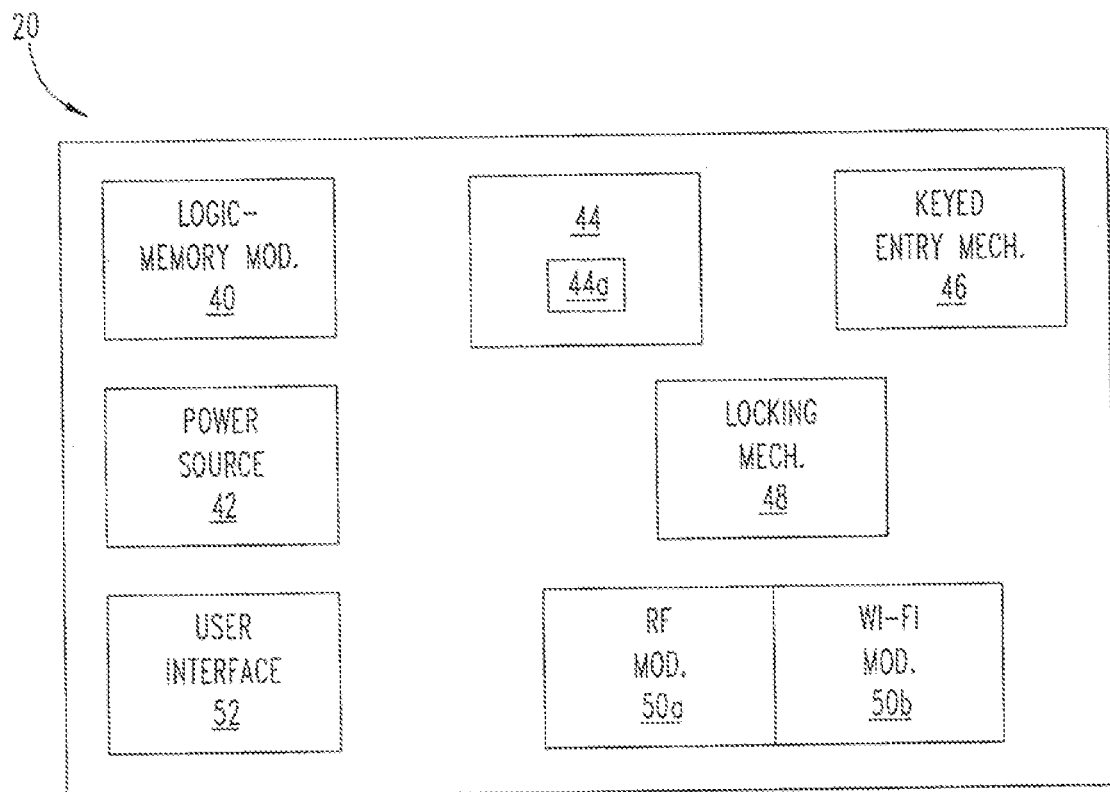
FIG. 3 is a block diagram of an access device that is configured for dual frequency communication with the computer network of FIG. 1.

The exemplary access device 20 shown in FIG. 1 is a door lock, which is further shown in a block diagram form in FIG. 3. The access device 20 includes a logic and memory module 40, a suitable power source 42, such as A/C power and/or battery power, a keyless entry system 44, a keyed entry mechanism 46, a locking mechanism 48, a multi-frequency transceiver 50, and a user interface 52.

The keyless entry system 44 includes a keypad 44*a* for entering an access code and other data. In other constructions, other data entry systems may be used in place of the keypad, such as biometric entry, smart cards, infrared readers, etc. Keyless entry system 44 may also or alternatively include a card reader for electronically reading an access code from a card carried by the user. The keyless entry system 44 communicates with the logic and memory module 40 that stores access codes and other user identification information and for carrying out the functions of the access device 20. The logic and memory module 40 may store individual user codes, where each person having access to the door is issued a unique user code that is stored and compared to input codes at the door to allow access decisions to be made at the door without transmissions over computer network 12. In one embodiment, logic and memory module includes a processor that drives communications with RF network 24 and establishes WI-FI connection 26 through appropriate hardware on access device 20 and bridge device 16. The logic and memory module 40 may further include an internal memory for storing credential data and audit data, and a real-time clock for determining times associated with access events. In addition, logic and memory module 40 is operable in a low power mode to preserve battery life. In one specific embodiment, logic and memory module 40 includes an advance reduced instruction set computer machine.

The keyed entry mechanism 46 can manually operate the locking mechanism 48, for example in case of power loss or other malfunction. The locking mechanism 48 of the access device 20 may include a locking device such as a sliding deadbolt, or other suitable locking mechanism coupled to a door handle or knob and/or to a key mechanism. In the illustrated construction, the locking mechanism 48 is power-driven, for example by a solenoid or an electric motor, to facilitate remote operation. The access device 20 may also include user interface 52 having visual components, such as an LED light and/or an LCD screen, and/or audio components, such as a speaker or other sound-generating device.

Where the access device 20 is part of a networked system 10 such as that described herein, functions that can be performed remotely through access control device 30 include, but are not limited to, confirming the status of a lock, such as whether the door lock is locked or unlocked, notifying the network of an attempted access, including whether the lock was accessed, when it was accessed and by whom, whether there were attempts at unauthorized access, and other audit information. In some constructions, the access device 20 can also receive and execute a signal to unlock the lock, add or delete user codes for locks having such codes, and, if the door lock is paired with a suitable camera (not shown), transmit images of the person seeking entry. The access device 20 can also be used to send a command to disarm an electronic alarm or security system, or to initiate a duress command from the keypad 44*a* of the access device 20, where the duress command may be utilized by the network to transmit a message to access control device 30 or other linked device, such as a computer terminal or mobile device, an electronic alarm or security system, or a networked computer server.

The access device 20 can be a self-contained functional lock such as an electronic lock used to secure an access point. Access device 20 includes an electronically-controlled system containing a keypad 44*a*, logic-memory module 40, and an electro-mechanical locking mechanism 48. Using the keypad 44a, a user can enter a numeric access code to activate the electro-mechanical locking mechanism 48 thus unlocking the door controlled by access device 20. The keypad 44a can also be used to program and configure the operation of the access device 20, such as adding access codes, deleting access codes, enabling audible operation, and setting relocking time delays. Additionally, the access device 20 includes multi-frequency transceiver 50, or interface, that can include an RF module 50a such as an antenna or programmable card for the reception and transmission of sub 1-GHz RF signals, a WI-FI module 50b configured to establish WI-FI connection 26 to and send and receive WI-FI signals to computer network 12, and all necessary electronic components required for the reception and generation of RF signals and WI-FI connection/disconnection with logic-memory module 40. The WI-FI interface with access control device 30 provides the same operation, programming, and configuration functionality as that afforded by the keypad 44a, in addition to a wide range of features including but not limited to audit information such as lock status reporting, lock operation reporting, lock battery status, and the like.

Figure 4:
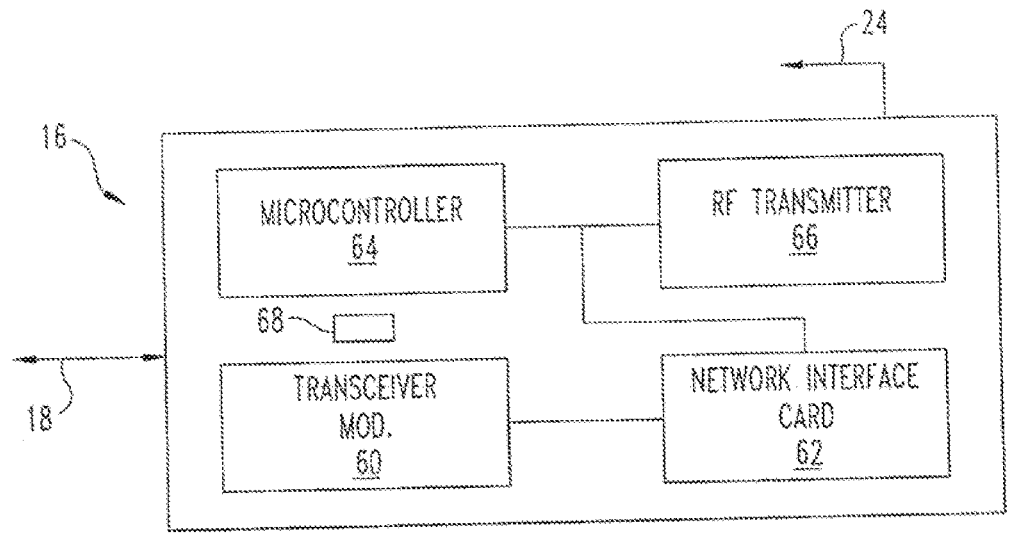
FIG. 4 is a block diagram of the radio frequency bridge device of FIG. 1.

FIG. 4 is a block diagram of the RF bridge device 16. The bridge device 16 includes a transceiver module 60, such as a power over Ethernet (PoE) receiver for sending and receiving signals to and from the computer network 12 via connection 18 via transmission control protocol/internet protocol (TCP/IP). Bridge device 16 also include a network interface card 62 connected to transceiver module 60. Network interface card 62 is connected to a microcontroller 64 and an RF transmitter 66. RF transmitter 66 receives commands from microcontroller 64 and provides output of RF signals over RF network 24. Bridge device 16 may also include a power source 68 and a user interface (not shown) for inputting information and obtaining status. Other transmission protocols besides Internet Protocol can also be employed to communicate with the computer network 12.

The RF transmitter 66 is suited for communication at the appropriate RF network frequency, for example sub-1 GHz, although other frequencies can be used as well. The RF transmitter 66 formats the RF signals it transmits according to the communications protocol that is being used. The RF bridge device 16 may include an antenna 17 (FIG. 1), which can be contained within the housing of the bridge device 16 or may be external to the housing. The transceiver module 60 formats the signals it sends according to the communications protocol, e.g. Internet Protocol, used to connect the computer network 12. In one construction, the RF bridge device 16 connects to a local-area network (LAN) via an Ethernet connection 18, although other types of connections are possible. As shown in FIG. 1, the connection 18 includes a cable having a plug to connect to an Ethernet port on a router 14. As illustrated in FIG. 1, the router 14 can include wireless Internet Protocol signaling to communicate with suitable wireless-compatible devices such as access devices 20. The transceiver module 60 may alternatively connect to a wireless router 16 using a wireless connection, for example using an IEEE 802.11x-based wireless networking protocol. The power source 68 of bridge device 16 can be a battery or other portable power supply, or an alternating current (A/C) or other fixed power source, or both. The user interface can include input mechanisms such as one or more buttons and an output mechanism such as a screen or indicator lights.

The microcontroller 64 can be any suitable logic-memory unit configured to coordinate the various functions of the RF bridge device 16 as discussed herein. The micro-controller 64 coordinates transfer of signals between the RF network 24 and the computer network 12. The microcontroller 64 translates signals from the transceiver module 60 into commands that the RF transmitter 66 broadcasts to the RF network 24 to access devices 20. The microcontroller 64 may also translate signals into commands for the transceiver module 60 to transmit to the computer network 12.

Figure 5:
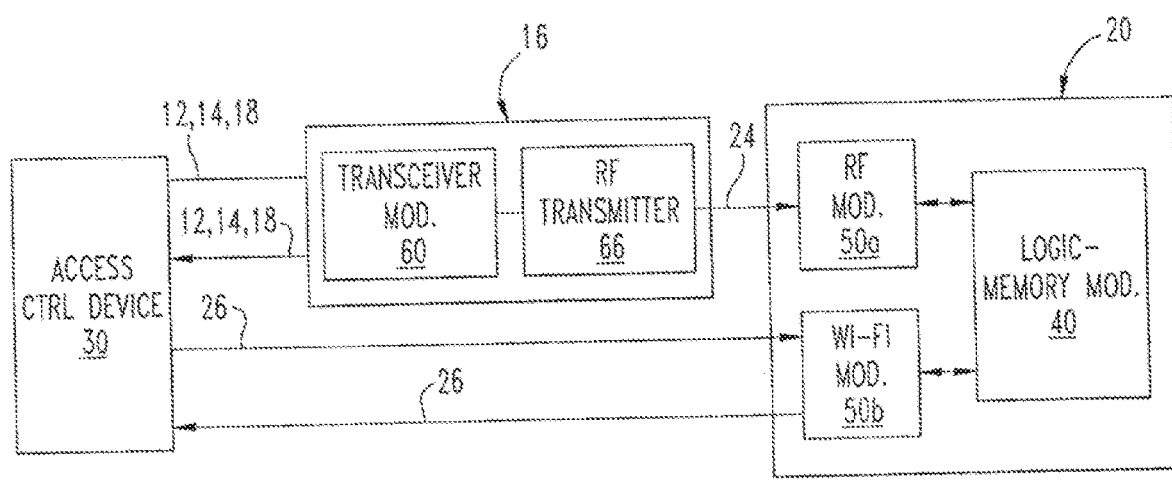
FIG. 5 is a block diagram of the system of FIG. 1 showing on-line communications protocols between the access control device, the radio frequency bridge device, and the access control device.

FIG. 5 illustrates additional details of the communications protocols of system 10 of FIG. 1. Access control device 30 is connected to transceiver module 60 of bridge device 16 with at least one of computer network 12, router 14 and Ethernet connection 18 for two-way communication. Transceiver module 60 is connected to RF transmitter 66 to provide RF signals over RF network 24. Each of the access devices 20 is connected to RF network 24 with RF module 50a to receive and interrogate a wakeup signal. RF module 50a is connected with logic-memory module 40 of access device 20 so that when a RF signal that is targeted to access device 20, access device 20 enters a wakeup mode of operation. In the wakeup mode, logic-memory module 40 activates WI-FI module 50b, which connects to computer network 12 via WI-FI connection 26 for two-way communication. Additional communications protocols are also contemplated and not precluded. For example, one or more remote devices, such as a networked computer and a mobile device, can connect to access control device 30 for access to computer network 12.

Access control device 30 can be, for example, a networked computer that is connected with computer network 12, and that can communicate with a mobile device or networked computer using HyperText Transfer Protocol (HTTP) commands or other protocols suited for use via the Internet or other connection, with appropriate web-browsing or other software being loaded on the mobile device or networked computer. Access control device 30 can include a database with, for example, user identifications, access device identifications, access device credentials, access device audit data, and programmed with software to manage the database information. Access control device 30 can further include software with user interface features that facilitate user operation of access control device 30 to view access device status, manage and update access devices 20 with programming, user credentials, and override commands, and to receive audit data from access devices 20.

Figure 6:
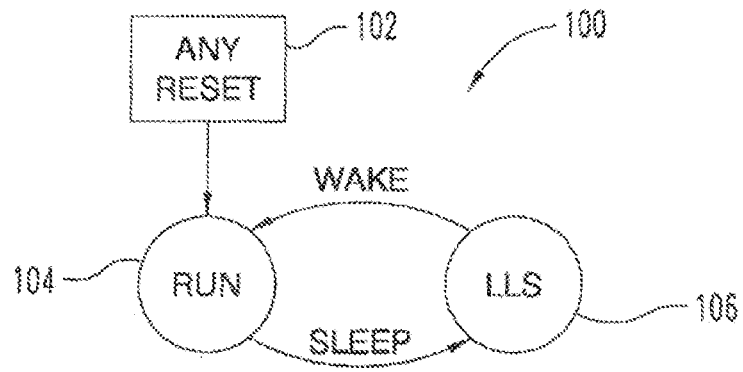
FIG. 6 is a flow diagram of the sleep and wake modes of operation of the access devices of FIG. 1.

FIG. 6 shows a flow diagram for a power state transition procedure 100 of access control device 20. Any reset operation 102 that provides an input to access device 20 can cause access device 20 to reset, and in particular logic-memory module 40, to enter a wakeup or run mode 104. Reset operation 102 can include a number of wakeup sources such as, for example, an entry of an access code to access device 20, reading of an access card by access device 20, an RF signal interrupt received by access device 20, a real time clock interrupt programmed into access device 20, tampering of access device, 20, or receipt of a data packet by access device 20 over WI-FI-connection 26 and/or RF network 24. After a predetermined time of inactivity, access device 20 transitions to a sleep mode 106, where logic-memory module 40 shuts down WI-FI connection 26, suspends all tasks relating to wireless operation, and shuts down power to WI-FI module 50b. In one embodiment, sleep mode 106 is a deep sleep mode with a low leakage stop (LLS) that provides a low level of power to enable wakeup operations, memory retention, and state retention of peripherals while preventing peripheral operation in the sleep mode. Other power retention and shutdown schemes are also contemplated so long as adequate battery life is preserved and/or power consumption is minimized for access device 20.

When a wakeup signal is received over RF network 24, access device 20 returns to wakeup operation under run mode 104 and powers WI-FI module 50b to establish WI-FI connection 26 and power up logic-memory module 40. The run mode 104 can include a low leakage wakeup module that flags the wakeup source and logs the wakeup source and time in memory of logic-memory module 40.

Figure 7:
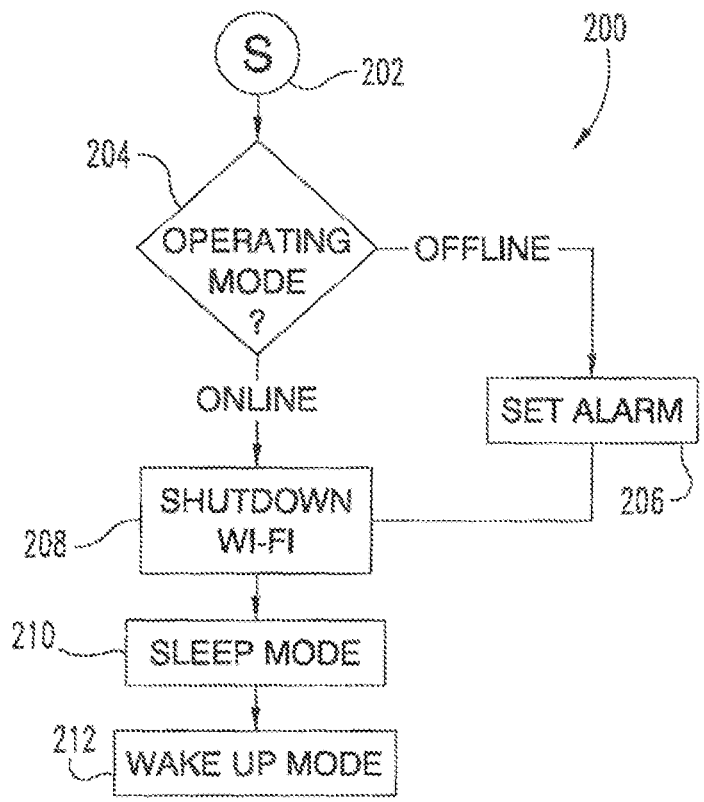
FIG. 7 is a flow diagram of a sleep mode of operation of the access control device of FIG. 1.

FIG. 7 shows a flow diagram for one embodiment of a procedure 200 for entry of access device 20 to sleep mode 106. Procedure 200 begins at sleep mode indicator 202 and continues at conditional 204 in which an operating mode of access device 20 is determined. In one embodiment, access device 20 is operable in either an on-line mode or an off-line mode. The on-line mode discussed hereinabove provides real time communications between access control device 30 and access devices 20 through WI-FI connection 26 by providing a wakeup signal over RF network 24 to the particular access devices 20 targeted for communication by access control device 30. As a result, access devices 20 can be updated in the on-line mode with user credentials and other information in real time by pushing the data to the targeted access devices 20 whenever desired. Battery life of access devices 20 is preserved and/or power consumption is minimized since access devices 20 can otherwise remain disconnected from computer network 12 by shutting down WI-FI connection 26 in the sleep mode.

In FIG. 1, certain access devices 20, designated as access devices 20' in FIG. 1, are configured to operate in an off-line mode since they are not connected to or operable to receive radio signals transmitted over RF network 24. Rather, access devices 20' are configured to communicate with access control device 30 solely through wireless connections 22 when the wireless connection is established. In order to preserve battery life and/or minimize power consumption, access devices 20' only establish WI-FI connections 22 at predetermined intervals, such as once a day, to receive updates of user credentials and other data, from access control device 30.

Referring back to FIG. 7, in procedure 200 if it is determined at conditional 204 that access device 20 is to operate in an off-line mode, procedure 200 continues at operation 206 in which an alarm is set that establishes a predetermined time or time interval for access device 20 to wake up and connect to computer network 12 for updates through WI-FI connection 26. If it is determined at conditional 204 that the access device 20 is to operate in an on-line mode, no alarm is set. Procedure 200 continues at operation 208 to shut down WI-FI module 50b and the WI-FI connection 26. Procedure 200 then continues at operation 210 where access device 20 enters a sleep mode until a wakeup signal is received, either via alarm or by an RF signal, depending on whether access device 20 is operating in an off-line mode or an on-line mode, respectively. Procedure 200 then continues at operation 212 where access device 20 continues in a wakeup mode of operation to communicate with computer network 12 and access control device 30 trough WI-FI connection 26.

Figure 8:
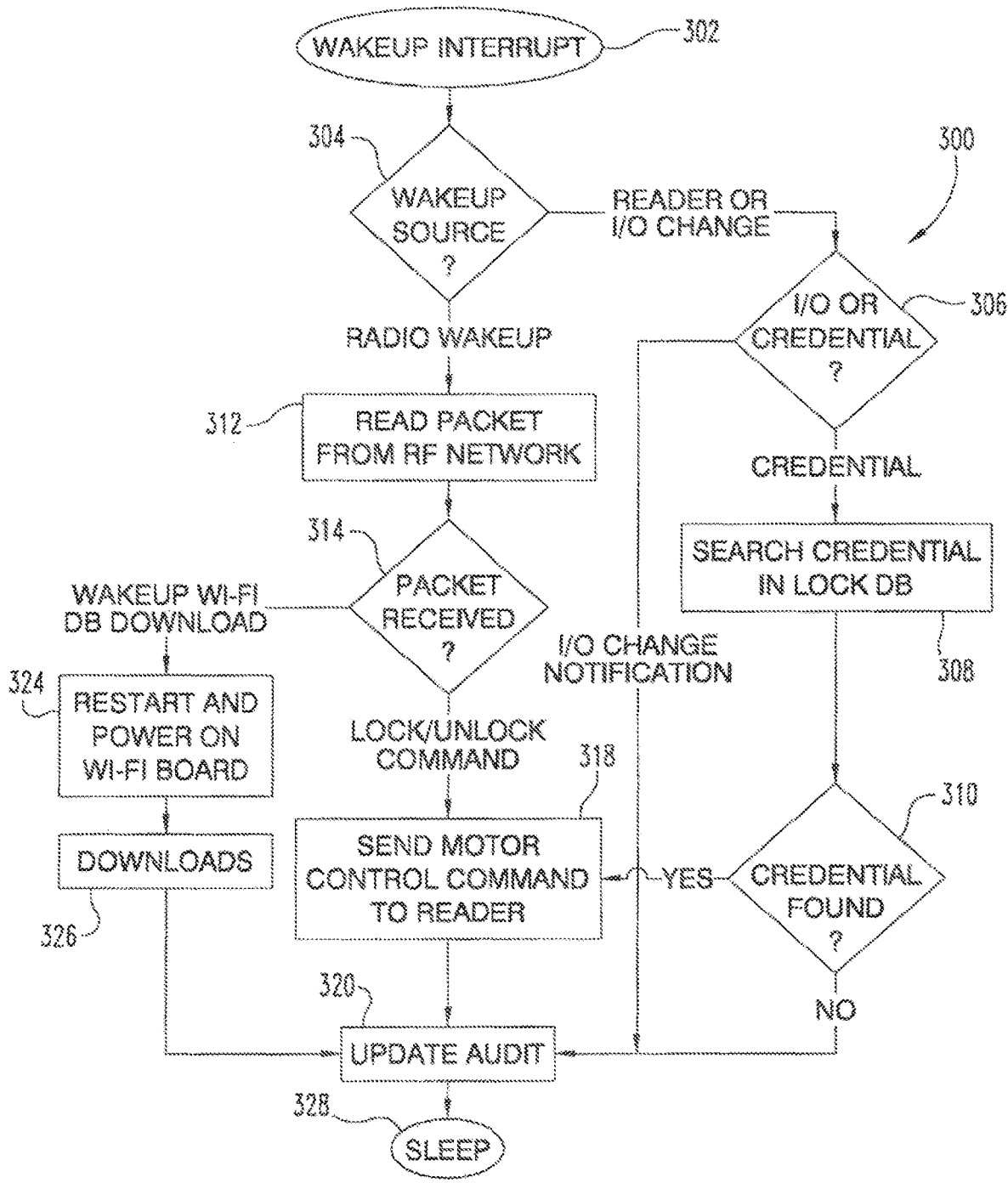
FIG. 8 is a flow diagram of a wakeup mode of operation for the access control device of FIG. 1.

Referring now to FIG. 8, there is shown a flow diagram for a wakeup procedure 300 for operation of access device 20 and system 10 in the on-line mode discussed above. Procedure 300 begins upon receipt of a wakeup signal at one or more of the access devices 20. At conditional 304 the wakeup source is determined. If the wakeup source is from keyless entry system 44, such as an entry to a reader of access device 20, an access code entered by keypad 44a, or an input/output (I/O) change from entry system 44 or logic-memory module 40 to change settings associated with access device 20, procedure 300 continues at conditional 306 to identify whether the wakeup source is a credential entry or an I/O change. If the wakeup source is associated with a credential entry, procedure 300 continues at operation 308 to search for the credential in the data stored in logic-memory module 40. Procedure 300 continues at conditional 310 to determine if the credential is found. If the credential is found at operation 308, procedure 300 continues at operation 318 where logic-memory module 40 sends a motor control command to open locking mechanism 48 of access control device 20. Procedure 300 then continues at operation 320 to update audit data associated with the unlocking of access device 20. Such audit data can include, for example, the identification of the access device, identification of the user credentials, and time of access. Alternatively, if at conditional 310 a user credential is not identified on the database of access device 20, procedure 300 proceeds directly to operation 320 to update audit data to record the time of attempted access with the access control device 20. After updating the audit data in logic-memory module 40 at operation 320, access control device 20 returns to sleep mode 328.

If at conditional 306 it is determined that the wakeup source is an I/O change, notification of the change is provided. Procedure 300 continues to operation 320 to update the audit data indicating, for example, the time of the I/O change and the particular I/O change that was made. After updating the audit data in logic and memory unit 40 at operation 320, access control device 20 returns to sleep mode 328. If the wakeup source determined at conditional 304 is from an access code entry or input/output (I/O) change WI-FI connection 26 is not established with computer network 12, preserving battery life of access device 20.

If at conditional 314 it is determined that the wakeup source was initiated by a radio signal from RF network 24, procedure 300 continues at operation 312 and access device 20 receives the radio signal and reads the packet transmitted to the access device 20. Procedure 300 continues at conditional 304 and determines the type of packet received by the access control device 20. If the packet is a wakeup signal indicating a download from access control device 30 is requested, access control device wakes up and restarts to power WI-FI module 50b at operation 324. The data from access control device 30 is then downloaded over WI-FI connection 26 at operation 326 to logic-memory module 40. Furthermore, audit data stored in logic-memory module 40 of access control device 20 is downloaded to access control device 30. Upon completion of downloads at operation 326, access control device 20 then returns to sleep mode 328.

If at conditional 304 it is determined the packet is a lock/unlock command from access control device 30, procedure 300 continues at operation 318 and logic-memory module 40 sends a motor control command to locking mechanism 48 to lock or unlock the lock of access control device 20. In one embodiment, the lock command is a command that over-rides user credentials and prevents any unlocking of access device 20. Procedure 300 then continues at operation 320 to update audit data associated with the locking and/or unlocking of access device 20. After updating the audit data in logic and memory unit 40 at operation 320, access control device 20 returns to sleep mode 328. If is determined at conditional 304 the packet is a lock/unlock command from access control device 30, WI-FI connection 26 is not established with computer network 12, preserving battery life of access devices 20.

For operation of access device 20 in an off-line mode, procedure 300 is modified since a radio signal from RF network 24 is not interrogated by access device 20. Rather, at conditional 304, if the modified procedure determines the wakeup source is from entry system 44 or I/O change, the procedure continues as discussed above. If the wakeup source is determined to be the alarm settings of access device 20, wireless module 50b is automatically powered on and connected to computer network 12 via WI-FI connection 26 to receive data download from access control device 30 and to transmit audit data to access control device 30 through WI-FI connection 26.

Figure 9A:
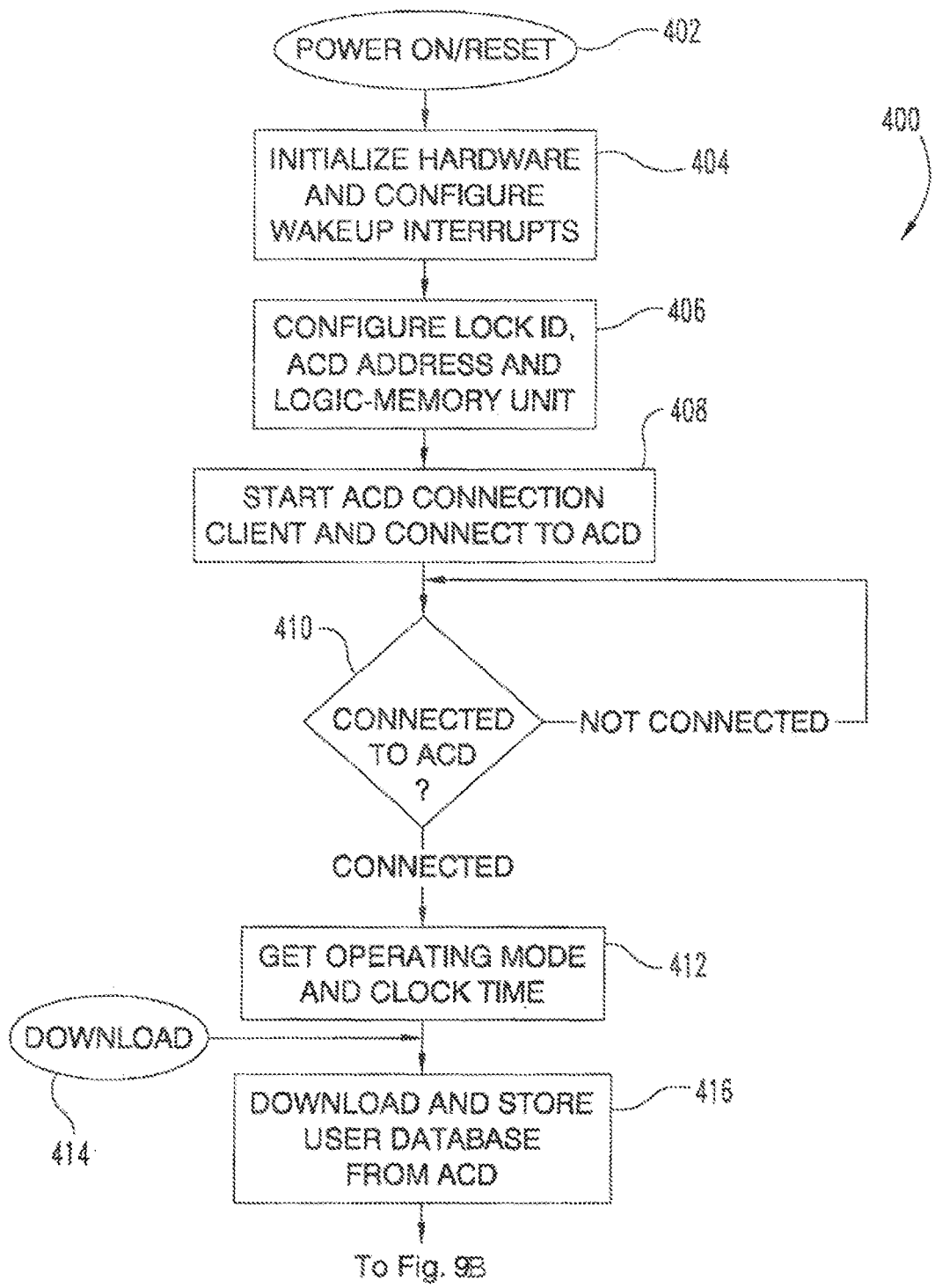
FIGS. 9A and 9B are flow diagrams of an initialization procedure for the access control device.
Figure 9B:
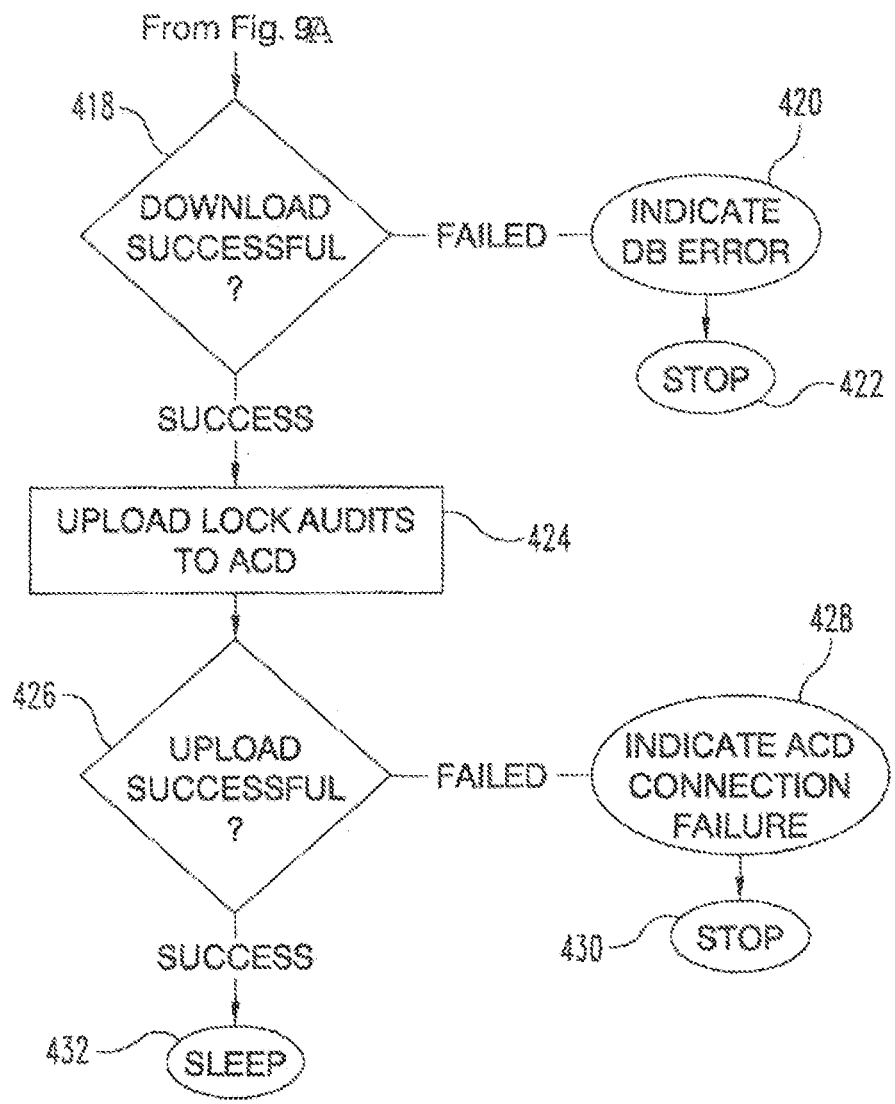

Referring now to FIGS. 9A and 9B, one example of a boot-up procedure 400 for access control devices 20 is shown. Boot-up procedure 400 begins at 402 upon initial power on or reset of the access control device 20. Procedure 400 continues at operation 402 and initializes the hardware of access device 20. Operation 402 also configures the wakeup interrupts that can be used based on the operating mode for access device 20, either on-line or off-line as discussed above. Procedure 400 continues at operation 406 and further configures the access device identification, the internet protocol address required to communicate with the access control device 30, and the logic-memory module 40 of access device 20. Procedure 400 then continues at operation 408 to start the access device connection client with access control device 30, and to connect with access control device 30. The starting of the connection client may include, for example, opening a TCP/IP client connection for communication with computer network 12 through WI-FI connection 26.

Procedure 400 continues at conditional 410 to determine if access device 20 is connected to access control device 30. Once access device 20 is connected, procedure 400 continues at operation 412 and retrieves the operating mode (on-line or off-line) and synchronizes with the access control software on access control device 30. Via a download 414, procedure 400 continues at operation 416 where the user and credential data is downloaded from the access control device 30 and stored in internal memory of logic-memory module 40. At conditional 418, it is determined if the download is successful. If the download 414 fails, a database error is indicated at output 420 and procedure 400 stops at 422. If download 414 is successful, procedure 400 continues at operation 424 to upload audit data to access control device 30. At conditional 426 it is determined whether the upload is successful. If the upload fails, procedure 400 continue by indicating a connection failure 428 with the access control device 30, and procedure 400 stops at 430. If the upload is successful, procedure 400 continues where access control device 20 enters a sleep mode at 432 for saving power.

According to one aspect, a method includes transmitting a first signal from an access control device via a first network to a radio frequency bridge device; in response to the first signal, transmitting a wake up signal from the radio frequency bridge device to at least one electronic access device that is operating in a sleep mode; waking the at least one electronic access device from the sleep mode in response to receiving the wake up signal; wirelessly connecting the electronic access device to the first network with a WI-FI connection in response to waking the at least one electronic access device with the wake up signal; and transmitting operating parameters to the electronic access device from the access control device through the WI-FI connection with the first network.

In one embodiment, the method includes updating the electronic access device with user credentials that authorize one or more users to unlock the electronic access device and/or updating software of a logic and memory unit of the electronic access device. In another embodiment, the method includes unlocking or locking the electronic access device in response to an unlocking command or a locking command, respectively, associated with the wake-up signal. In yet another embodiment, the method includes transmitting a second signal from the electronic access device to the access control device through the WI-FI connection with the first network. In a refinement of this embodiment, the second signal includes at least one of: whether the electronic access device is locked or unlocked, whether the electronic access device has been accessed, an identity of a user who has accessed or attempted to access the electronic access device, and whether a distress code has been entered.

In another embodiment, the method includes configuring a plurality of electronic access devices to interrogate the wake up signal. In one refinement of the embodiment, only a portion of the plurality of electronic access devices wake in response to interrogating the wake up signal from the radio frequency bridge device. In a further refinement, each electronic access device of the portion of the plurality of electronic access devices that wake wirelessly connect to the first network through the WI-FI connection in response to receiving the wake up signal. In another refinement of the embodiment, the first network is a local area network and further comprising connecting the local area network to the radio frequency bridge device with an Ethernet connection.

In another aspect, a system is disclosed. The system includes an access device with a locking mechanism movable between a locked and unlocked position, a keyless entry system operably connected to the locking mechanism, a logic and memory module connected to the keyless entry system, a multi-frequency transceiver connected to the logic and memory module, and a power source. The system also includes a radio frequency bridge device with a radio frequency transmitter and a transceiver configured to receive signals from a computer network. The transceiver is operatively connected to the radio frequency transmitter to cause the radio frequency transmitter to output a radio signal in response to the signals from the computer network. The multi-frequency transceiver of the access device is configured to receive the radio signal from the transmitter. The system also includes an access control device operatively connected to the computer network. The access control device includes a database with user credentials and access device identification information. The access control device is configured to transmit the signals over the computer network to the radio frequency bridge device, and the access control device is further configured to transmit database information to the access device via a WI-FI connection of the multi-frequency transceiver of the access device to the computer network. The WI-FI connection is established in response to the access device interrogating the radio signal from the radio frequency bridge device.

In one embodiment, the access device further includes a user interface. In another embodiment, the access device includes a keyed entry mechanism for manually operating the locking mechanism. In yet another embodiment, the keyless entry system includes a keypad for entering an access code to the logic and memory module. In a further embodiment, the multi-frequency transceiver includes a radio frequency module configured to receive the radio signal from the radio frequency bridge device and a WI-FI module configured to establish a WI-FI connection with the computer network in response to interrogation of the radio signal.

In another embodiment, the transceiver of the radio frequency bridge device is an internet protocol transceiver. In yet another embodiment, the radio frequency transmitter is configured to transmit the radio signal at sub-1 GHz. In another embodiment, the system includes a router connecting the radio frequency bridge device with the computer network. In a further embodiment, the power source of the access device is a battery. In another embodiment, the radio frequency bridge device includes a network interface card connected to the transceiver and a microcontroller connected to the radio frequency transmitter and the network interface card.

In another aspect, a system is disclosed that includes a computer network and a plurality of access devices. The computer network includes an access control device with a database including at least user credentials and access device identification information. The computer network also includes a wireless routing device connected to the access control device and to a radio frequency transmitter configured to transmit a radio signal. The access devices each include a locking mechanism movable between a locked and unlocked position, a keyless entry system operably connected to the locking mechanism, a logic and memory module connected to the keyless entry system, a multi-frequency transceiver connected to the logic and memory module, and a power source. The multi-frequency transceiver is operable to receive the radio signal from the radio frequency transmitter to transition the access device from a sleep mode of operation to a wake mode of operation. When in the wake mode of operation the multi-frequency transmitter is configured to establish a WI-FI connection with the wireless routing device for data transmission between the access device and the access control device.

In one embodiment, the multi-frequency transmitter includes a radio frequency module that is configured to interrogate the radio signal before transitioning the access device from the sleep mode of operation to the wake mode of operation. In another embodiment, the access control device is configured to identify a portion of the plurality of access devices and configure the radio frequency transmitter to transmit the radio signal to targeted access devices. In yet another embodiment, the radio frequency transmitter is part of a bridge device that is connected to the routing device with an Ethernet connection. In a further embodiment, the multi-frequency transceiver of each of the plurality of access devices is operable to receive the radio signal from the radio transmitter and unlock or lock the access device in response to the radio signal.

While the invention has been illustrated and described in detail in the drawings and foregoing description, the same is to be considered as illustrative and not restrictive in character, it being understood that only the certain embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    transmitting, by a second device over a first wireless communication connection and in response to receiving a communication from an access control device, a wake-up signal to an electronic door lock that is operating in a sleep mode;
    waking the electronic door lock from the sleep mode in response to receiving the wake-up signal;
    communicatively coupling the electronic door lock to the access control device via a second wireless communication connection in response to waking the electronic door lock with the wake-up signal, wherein the second wireless communication connection utilizes a different communication protocol from the first wireless communication connection; and
    transmitting one or more operating parameters between the electronic door lock and the access control device via the second wireless communication connection.

2. The method of claim 1, wherein the second wireless communication connection comprises a Wi-Fi connection.

3. The method of claim 1, wherein the electronic door lock is communicatively coupled to the access control device via a routing device.

4. The method of claim 1, wherein the second wireless communication connection uses an IEEE 802.11x-based wireless networking protocol.

5. The method of claim 1, further comprising disconnecting the second wireless communication connection between the electronic door lock and the access control device to decrease power consumed by the electronic door lock.

6. The method of claim 1, wherein transmitting the one or more operating parameters comprises updating the electronic door lock with user credentials that authorize one or more users to unlock the electronic door lock.

7. The method of claim 1, further comprising unlocking or locking the electronic door lock in response to an unlocking command or a locking command, respectively, associated with the wake-up signal.

8. An electronic lock, comprising:
    a locking mechanism movable between a locked position and an unlocked position; and
    a multi-frequency transceiver operable to (i) receive a wireless communication signal from a radio frequency device to transition the electronic lock from a sleep mode of operation to a wake mode of operation and (ii) establish a communication connection with an access control device for data transmission between the electronic lock and the access control device in response to the electronic lock transitioning to the wake mode of operation;
    wherein the communication connection between the electronic lock and the access control device is via a different communication protocol from the communication protocol through which the electronic lock receives the wireless communication signal from the radio frequency device; and
    wherein the access control device includes a database storing at least one of user identifications, access device identifications, access device credentials, or access device audit data.

9. The electronic lock of claim 8, wherein the communication connection with the access control device for data transmission between the electronic lock and the access control device comprises a Wi-Fi connection.

10. The electronic lock of claim 8, further comprising a keyed entry mechanism for manually operating the locking mechanism.

11. The electronic lock of claim 8, further comprising:
a memory; and
a processor configured to update at least one of credential data or audit data stored in the memory in response to the data transmission from the access control device.

12. The electronic lock of claim 8, further comprising a user interface having at least one of a visual component or an audio component.

13. The electronic lock of claim 8, further comprising a keypad for user entry of an access code to the electronic lock.

14. The electronic lock of claim 8, wherein the multi-frequency transceiver is operable to receive a signal and unlock or lock the locking mechanism of the electronic lock in response to the signal.

15. A system, comprising:
an access device comprising a locking mechanism movable between a locked and unlocked position, a logic and memory module, a multi-frequency transceiver connected to the logic and memory module, and a power source;
a radio frequency device comprising a radio frequency transmitter and a transceiver configured to receive signals from a first network, wherein the transceiver is operatively connected to the radio frequency transmitter to cause the radio frequency transmitter to output a radio signal in response to the signals from the first network, wherein the multi-frequency transceiver of the access device is configured to receive the radio signal from the transmitter; and
an access control device operatively connected to the first network, the access control device including a database with at least one of user credentials, access device identification information, or access device audit data, wherein the access control device is configured to transmit signals over the first network to the radio frequency device, and the access control device is further configured to transmit database information to the access device via a wireless communication connection of the multi-frequency transceiver of the access device to the first network, wherein the wireless communication connection is established in response to the access device receiving the radio signal from the radio frequency device and (ii) waking the access device from a sleep mode of operation in response to the radio signal.

16. The system of claim 15, wherein the wireless communication connection comprises a Wi-Fi connection.

17. The system of claim 15, wherein the access device further comprises a keyed entry mechanism for manually operating the locking mechanism.

18. The system of claim 15, wherein the radio frequency device is configured to communicate over sub-1 GHz radio frequencies.

19. The system of claim 15, wherein the access device is further configured to update at least one of credential data or audit data stored in the logic and memory module in response to receipt of the database information from the access control device.

20. The system of claim 15, wherein the radio frequency device comprises at least one of a battery or portable power supply.

* * * * *